United States Patent [19]
Kai et al.

[11] Patent Number: 5,912,564
[45] Date of Patent: Jun. 15, 1999

[54] VOLTAGE-BOOSTING CIRCUIT WITH MODE SIGNAL

[75] Inventors: Yasukazu Kai; Kenji Satou; Yuichi Matsusita, all of Miyazaki, Japan

[73] Assignee: Oki Electric Industry Co., Ltd., Tokyo, Japan

[21] Appl. No.: 08/814,598

[22] Filed: Mar. 10, 1997

[30] Foreign Application Priority Data

Mar. 26, 1996 [JP] Japan .................................. 8-069820

[51] Int. Cl.⁶ .............................................. H03K 19/094
[52] U.S. Cl. ............................................ 326/68; 326/88
[58] Field of Search .................................. 326/68, 80, 81, 326/88, 93, 95, 98; 327/589, 536, 537, 540, 390

[56] References Cited

U.S. PATENT DOCUMENTS

5,677,645  10/1997  Merritt ..................................... 327/536

Primary Examiner—Michael Tokar
Assistant Examiner—Qui Van Duong
Attorney, Agent, or Firm—Venable; Robert J. Frank

[57] ABSTRACT

A voltage-boosting circuit outputs a boosted voltage at different potentials in response to a mode signal. In a first aspect of the invention, the boosted voltage is produced by two capacitors, both of which are driven when the mode signal is in a first state, and only one of which is driven when the mode signal is in a second state. In second and third aspects of the invention, the boosted voltage is changed by switching a power-supply potential fed to a capacitor in the voltage-boosting circuit. In a fourth aspect of the invention, the boosted voltage is output through two parallel switching elements, both of which switch on when the mode signal is in the first state, and only one of which switches on when the mode signal is in the second state.

28 Claims, 9 Drawing Sheets

VOLTAGE-BOOSTING CIRCUIT WITH MODE SIGNAL

BACKGROUND OF THE INVENTION

The present invention relates to a voltage-boosting circuit suitable for use in an electronic device which is tested under conditions outside normal operating limits.

Many electronic devices have circuits which must operate at a boosted voltage level, exceeding the voltage supplied to other circuits in the device. In a dynamic random-access memory (DRAM), for example, the word-line driving circuits may require a boosted voltage. Voltage-boosting circuits such as charge pumps are widely employed to produce such boosted voltages.

Before shipment, electronic devices are often put through burn-in tests, in which the devices are intentionally stressed by continuous operation at an abnormally high voltage level, in a high-temperature environment. DRAMs, for example, are burned in so that memory cells prone to early failure can be discovered.

The boosted voltage generated by a conventional voltage-boosting circuit during a burn-in test is higher than the boosted voltage generated during normal operation, because the original power-supply voltage is higher. Since a burn-in test may last for a considerable time, circuit elements that receive the boosted voltage are sometimes damaged, even though these elements would not fail under normal operating conditions. The burn-in test then has the undesired result of reducing production yields by unnecessarily creating defective devices.

SUMMARY OF THE INVENTION

It is accordingly an object of the present invention to improve production yields of electronic devices by avoiding circuit damage during burn-in tests.

Another object of the invention is to provide a voltage-boosting circuit capable of generating either of two different boosted voltages, responsive to a mode signal.

The invented voltage-boosting circuit receives a first potential, a second potential, a third potential, a clock signal, and a mode signal. The second potential is intermediate between the first and third potentials. The mode signal is placed in a first state during normal operation, and in a second state during unusual conditions such as burn-in test conditions.

According to a first aspect of the invention, the voltage-boosting circuit has a timing generator that receives the clock signal and outputs a first timing signal and a second timing signal. Both timing signals alternate between active and inactive states. Transitions of one timing signal occur in synchronization with rising transitions of the clock signal, and at times delayed from failing transitions of the clock signal. Transitions of the other timing signal occur in synchronization with falling transitions of the clock signal, and at times delayed from rising transitions of the clock signal.

A first driving circuit outputs a first driving signal that alternates between the first and third potentials in synchronization with the transitions of the first timing signal. A second driving circuit outputs a second driving signal that alternates between the first and second potentials in synchronization with the transitions of the second timing signal. The first driving signal goes to the third potential after the second driving signal goes to the second potential, and returns to the first potential before the second driving signal returns to the first potential.

A third driving circuit receives the second timing signal and the mode signal, and outputs a third driving signal. When the mode signal is in the first state, the third driving signal behaves like the second driving signal, alternating between the first and second potentials in synchronization with the transitions of the second timing signal. When the mode signal is in the second state, output of the third driving circuit is disabled, meaning that the third driving signal is held at the first potential, or is placed in a floating state, or alternates between the first potential and the floating state.

The first driving signal is supplied to the first electrode of a first capacitor. The second electrode of the first capacitor receives the third potential through a first switching element that allows the first capacitor to be charged from the third potential, but prevents the first capacitor from discharging to the third potential. When the first electrode of the first capacitor is at the third potential, the second electrode is accordingly boosted to a potential exceeding the third potential.

The second driving signal is supplied to the first electrode of a second capacitor. The second electrode of the second capacitor is coupled to an output terminal through a second switching element that allows the second capacitor to discharge to the output terminal, with substantially no voltage drop in the second switching element, when the second electrode of the first capacitor is boosted as described above. The second electrode of the second capacitor also receives the third potential through a third switching element that allows the second capacitor to be charged from the third potential, but prevents the second capacitor from discharging to the third potential.

The third driving signal is supplied to the first electrode of a third capacitor. The second electrode of the third capacitor is coupled to the second electrode of the second capacitor.

The output terminal is boosted to different potentials responsive to the mode signal, because both the second and third capacitors are driven when the mode signal is in the first state, and only the second capacitor is driven when the mode signal is in the second state.

According to a second aspect of the invention, the third driving circuit and third capacitor of the first aspect are replaced by a power-supply switching circuit that receives the second and third potentials and the mode signal, outputs the third potential when the mode signal is in the first state, and outputs the second potential when the mode signal is in the second state. The potential output by the power-supply switching circuit charges the first and second capacitors through the first and third switching elements. The output terminal is accordingly boosted to different potentials responsive to the mode signal.

According to a third aspect of the invention, the third driving circuit and third capacitor of the first aspect are replaced by a similar power-supply switching circuit coupled to the first driving circuit. The first driving signal alternates between the first and third potentials when the mode signal is in the first state, and between the first and second potentials when the mode signal is in the second state. The output terminal is again boosted to different potentials responsive to the mode signal, because when the mode signal is in the second state, a voltage drop occurs in the second switching element.

According to a fourth aspect of the invention, the third driving circuit and third capacitor of the first aspect are replaced by a fourth switching element, and the mode signal is supplied to the timing generator. The fourth switching element is coupled in parallel with the second switching element between the second electrode of the second capacitor and the output terminal, and allows the second capacitor to discharge to the output terminal, but with a fixed voltage drop. When the mode signal is in the second state, the first driving signal is held at the first potential, the potential of the second electrode of the first capacitor is not boosted, and the fixed voltage drop in the fourth switching element limits the potential to which the output terminal can be boosted. When the mode signal is in the first state, the first driving signal alternates between the first and third potentials, the potential of the second electrode of the first capacitor is boosted, and the potential of the output terminal is boosted through the second switching element with substantially no voltage drop.

According to all aspects of the invention, therefore, the potential at the output terminal is boosted by less when the mode signal is in the second state than when the mode signal is in the first state.

DETAILED DESCRIPTION OF THE INVENTION

Embodiments of the invention will be described below with reference to the attached drawings. In these embodiments, the first potential is a ground potential denoted by the conventional ground symbol or the letters GND, the second potential is a positive power-supply potential denoted VT)D, and the third potential is a higher power-supply potential denoted VBOOST. When the invention is practiced in an integrated circuit such as a memory device, one or both of these potentials VDD and VBOOST are created by, for example, conversion of an external potential supplied to the integrated circuit. Descriptions of the circuits that generate VDD) and VBOOST will be omitted, to avoid obscuring the invention with irrelevant detail.

Various signals will be referred to below as being in the high or low state. High refers to the VDD potential, and low to the ground potential.

The embodiments comprise n-channel and p-channel metal-oxide-semiconductor field-effect transistors. The n-channel transistors will be referred to as NMOS transistors, and the p-channel transistors as PMOS transistors.

The same reference numerals will be used to denote identical or corresponding elements in different embodiments.

First Embodiment

Figure 1:
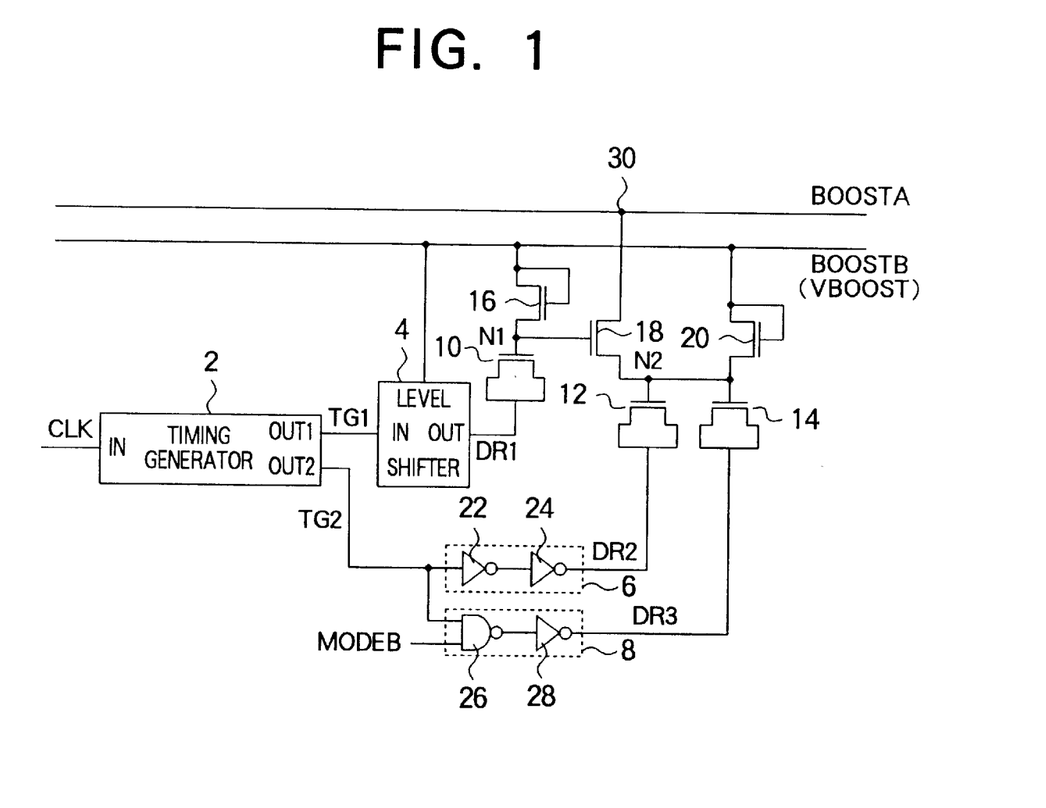
FIG. 1 is a circuit diagram of a first embodiment of the invention.

As an example of the first aspect of the invention, FIG. 1 shows a first embodiment comprising a timing generator 2, three driving circuits 4, 6, and 8, three metal-oxide-semiconductor capacitors 10, 12, and 14, and three switching elements 16, 18, and 20.

The timing generator 2 has an input terminal IN at which an externally-supplied clock signal CLK is received, and output terminals OUT1 and OUT2 from which respective timing signals TG1 and TG2 are output. Both timing signals alternate between the high and low levels. The first timing signal TG1 is active low: the low state is the active state and the high state is the inactive state. The second timing signal TG2 is active high: the high state is the active state and the low state is the inactive state. The timing generator 2 will be described in more detail below.

The first driving circuit 4, referred to below as a level shifter, has an input terminal (IN) that receives the first timing signal TG1, and an output terminal (OUT) from which a first driving signal DR1 is output. The level shifter 4 is powered from a power-supply line BOOSTB, which supplies the VBOOST potential. The level shifter 4 will be described in more detail below.

The second driving circuit 6 comprises a pair of inverters 22 and 24 coupled in series to the second output terminal OUT2 of the timing generator 2. The outputs of these inverters 22 and 24 assume the high and low levels responsive to the second timing signal TG2. The output of inverter 24 is a second driving signal DR2.

The third driving circuit 8 comprises a two-input NAND gate 26 that receives the second timing signal TG2 and a mode signal (MODEB), and an inverter 28 that receives the output of the NAND gate 26. The outputs of the NAND gate 26 and inverter 28 assume the high and low levels responsive to TG2 and MODEB. The output of inverter 28 is a third driving signal DR3.

The first capacitor 10 is structurally similar to an NMOS transistor, the source, channel, and drain of which form a first plate or first electrode, and the gate of which forms a second plate or second electrode. The first (source-drain) electrode receives the first driving signal DR1. The second (gate) electrode is coupled to a node denoted N1 in the drawings.

The second and third capacitors 12 and 14 are similar in structure to the first capacitor 10, but receive the second and third driving signals DR2 and DR3, respectively, at their first (source-drain) electrodes. The second electrodes of both capacitors 12 and 14 are both coupled to a node denoted N2.

The first switching element 16 is an NMOS transistor, the source of which is coupled to node N1. The drain and gate of NMOS transistor 16 are both coupled to power-supply line BOOSTB. Transistor 16 therefore operates like a diode switch, allowing current to flow from BOOSTB into capacitor 10, but not in the opposite direction.

The second switching element 18 is another NMOS transistor, the gate of which is coupled to node N1, the drain of which is coupled to node N2, arid the source of which is coupled to an output terminal 30 that supplies a boosted voltage to a load (not shown) through a voltage output Line BOOSTA.

The third switching element 20 is also an NMOS transistor, the source of which is coupled to node N2, and the gate and drain of which are coupled to BOOSTB. This transistor 20 also operates like a diode switch, allowing current to flow from BOOSTB to capacitors 12 and 14, but not in the opposite direction.

To simplify the description, it will be assumed below that NMOS transistors 16, 18, and 20 all have the same threshold voltage Vt, and that:

$$VBOOST > VDD + Vt$$

Figure 2:
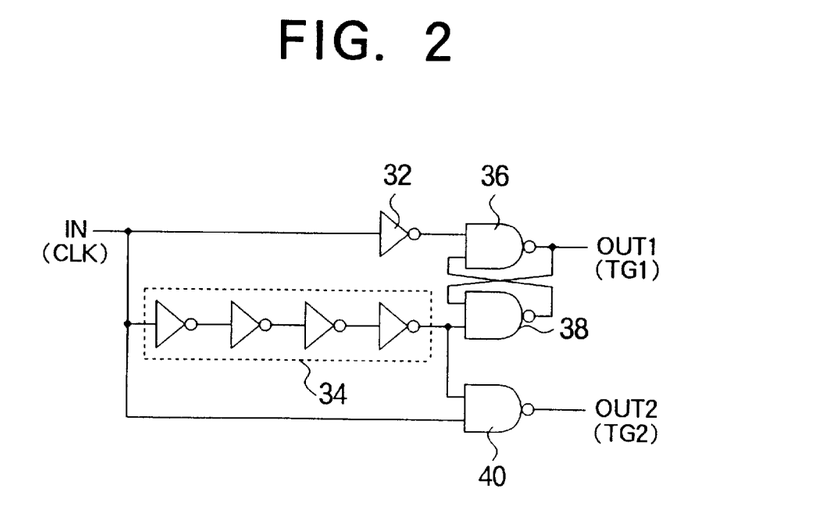
FIG. 2 is a circuit diagram of the timing generator employed in the first to fifth embodiments.

FIG. 2 is a circuit diagram of the timing generator 2, which comprises an inverter 32, a delay line 34, and three NAND gates 36, 38, and 40. AIL of these circuit elements receive the VDD and ground potentials as their power-supply potentials.

The inverter 32 and delay line 34 both receive the clock signal (CLK) from the input terminal (IN). The delay line 34 comprises an even number of inverters (four in the present case) coupled in series.

NAND gates 36 and 38 are cross-coupled, each receiving the output of the other. NAND gate 36 also receives the output of inverter 32, while NAND gate 38 receives the output of the delay line 34. The output of NAND gate 36 is the first timing signal (TG1) supplied from the first output terminal OUT1.

NAND gate 40 receives the clock signal (CLK) from the input terminal (IN), and receives the output of the delay line 34. The output of NAND gate 40 is the second timing signal (TG2) supplied from the second output terminal OUT2.

Figure 3:
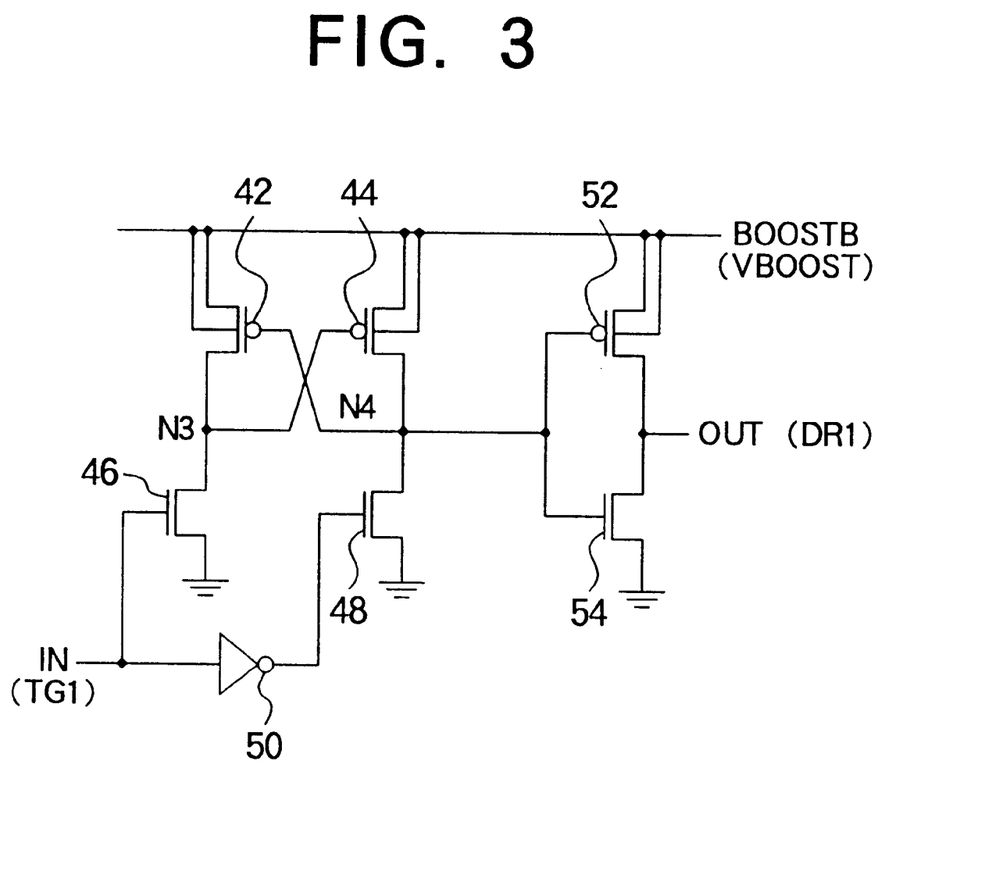
FIG. 3 is a circuit diagram of the level shifter employed in the first to sixth embodiments.

FIG. 3 is a circuit diagram of the level shifter 4. The level shifter 4 has an amplifying stage comprising PMOS transistors 42 and 44, NMOS transistors 46 and 48, and an inverter 50, and an inverting stage comprising a PMOS transistor 52 and an NMOS transistor 54. The sources (and substrate bulks or wells) of PMOS transistors 42, 44, and 52 are all coupled to power-supply line BOOSTB. The sources of NMOS transistors 46, 48, and 54 are all coupled to ground.

The drain (node N3) of PMOS transistor 42 is coupled to the gate of PMOS transistor 44 and to the drain of NMOS transistor 46. The drain (node N4) of PMOS transistor 44 is coupled to the gates of PMOS transistors 42 and 52, the drain of NMOS transistor 48, and the gate of NMOS transistor 54. The input terminal (IN) of the level shifter 4 is coupled to the gate of NMOS transistor 46, and through inverter 50 to the gate of NMOS transistor 48. The drains of PMOS transistor 52 and NMOS transistor 54 are both coupled to the output terminal (OUT).

Next, the operation of the first embodiment will be described. Separate descriptions will be given for the case in which MODEB is in the high state, referred to below as the normal mode, and the case in which MODEB is in the low state, referred to below as the burn-in mode. MODEB is controlled externally, being placed in the high state during normal operation and in the low state during a burn-in test.

Figure 4A:
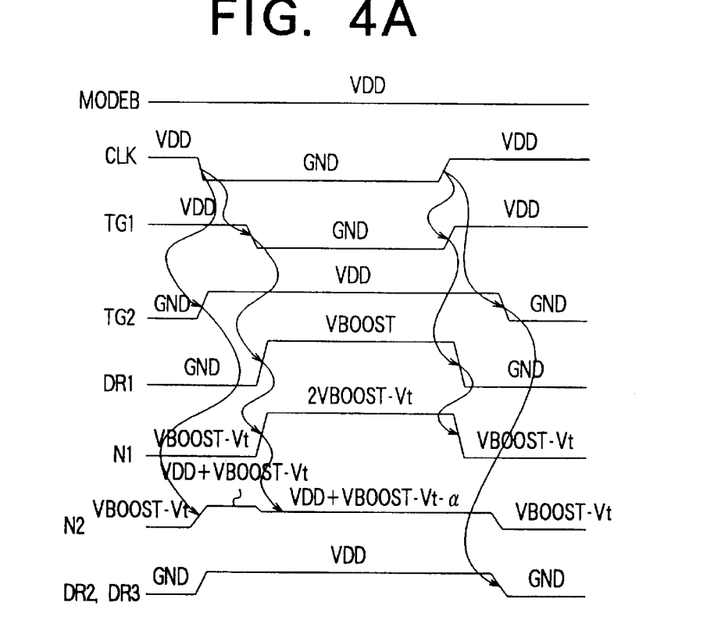
FIG. 4A is a timing diagram illustrating the operation of the first embodiment when the mode signal is in the first state.

FIG. 4A illustrates the operation in the normal mode. Initially the clock signal CLK is high, the three driving signals DR1, DR2, and DR3 are all at the ground level, and the first electrodes of capacitors 10, 12, and 14 are likewise at the ground level. The second electrodes of capacitors 10, 12, and 14 (nodes N1 and N2) are charged from the power-supply line BOOSTR through the first and third NMOS transistors 16 and 20. Since the drains and gates of transistors 16 and 20 are at the same potential, a voltage drop of Vt occurs between the sources and drains of these transistors, and nodes N1 and N2 are raised to a potential of VBOOST−Vt rather than the potential (VBOOST) of power-supply line BOOSTB. The drain and gate of the second NMOS transistor 18 are also at the same potential, so a similar voltage drop of Vt occurs between the source and drain of transistor 18, and the potential of the output terminal 30 and voltage output line BOOSTA is initially raised no higher than VBOOST−2Vt.

When the clock signal CLK falls from the high level to the low level, in the timing generator 2 shown in FIG. 2, the output of NAND gate 40 goes high, so the second timing signal TG2 goes high. After a certain delay, the output of the delay line 34 goes low, forcing the output of NAND gate 38 to go high. The output of inverter 32 is also high, so both inputs to NAND gate 36 are high, and the first timing signal TG1 goes low.

When timing signal TG2 goes high, the second driving signal DR2 is driven high (to VDD) by inverters 22 and 24 in FIG. 1. Since the mode signal MODEB is high, the output of NAND gate 26 goes low and the output of inverter 28 goes high, driving the third driving signal DR3 to the high level (VDD). The potentials of both the first and second electrodes of capacitors 12 and 14 now rise by VDD, the potential of node N2 becoming VDD+VBOOST−Vt. Since node N2 is at a higher potential than VBOOST, the third NMOS transistor 20 turns off.

When timing signal TG1 goes low slightly later, in the level shifter 4 shown in FIG. 3, NMOS transistor 46 turns off and NMOS transistor 48 turns on, taking node N4 to the low level. PMOS transistor 42 is thereby turned on, and node N3 is brought to the VBOOST level, turning off PMOS transistor 44. In addition, when node N4 goes low, PMOS transistor 52 turns on, NMOS transistor 54 turns off, and the first driving signal DR1 rises from the ground level to the VBOOST level. The potential of node N1 in FIG. 1 is thereby raised from VBOOST−Vt to 2VBOOST−Vt. Node N1 is at a higher potential than VBOOST, so the first NMOS transistor 16 turns off.

Due to the voltage-boosting of nodes N1 and N2, the gate potential of the second NMOS transistor 18 is now 2VBOOST−Vt, and its drain potential is VDD+VBOOST−Vt. Since the gate potential exceeds the drain potential by more than Vt (because VHOOST>VDD+Vt), node N2 can discharge to the output terminal 30 with substantially no voltage drop in transistor 18, until the potentials of node N2 and the output terminal 30 are substantially equal. Some of the charge stored in the second and third capacitors 12 and 14 is thereby supplied through node N2, transistor 18, output terminal 30, and the voltage output line BOOSTA to the above-mentioned load (not shown), reducing the potential at node N2 from VDD+VBOOST−Vt to a lower level VDD+VBOOST−Vt−α. The value of α is determined by the load impedance and the combined parallel capacitance value of capacitors 12 and 14.

When CLK next rises from the low level to the high level, the first timing signal TS1 is immediately driven high by inverter 32 and NAND gate 36 in the timing generator 2, and the first driving signal DR1 is returned from VBOOST to the ground level by the level shifter 4, causing node N1 to return from 2VBOOST−Vt to VBOOST−Vt. After a certain delay, the second timing signal TG2 is driven low by the delay line 34 and NAND gate 40 in the timing generator 2, causing the second and third driving signals DR2 and DR3 to go low and the potential of node N2 to fall from VDD+VBOOST−Vt−α toward VBOOST−Vt−α. When the potential at node N2 falls below VBOOST−Vt, however, the third NMOS transistor 20 turns on, allowing node N2 to be recharged from power-supply line BOOSTB. The potential of node N2 therefore settles at VBOOST−Vt.

Since nodes N1 and N2 are at identical potentials of VBOOST−Vt and the output terminal 30 is now at a higher potential (VDD+VBOOST−Vt−α), the gate potential of the second NMOS transistor 18 is equal to or less than both its source and drain potentials. Transistor 18 is therefore turned off, preventing charge from escaping from the voltage output line BOOSTA back to node N2.

As the above operation continues during further clock cycles, charge is repeatedly transferred from power-supply line BOOSTB to node N2, then raised to a higher potential and transferred to the output terminal 30. In this way the voltage output line BOOSTA is boosted above the VBOOST potential of power-supply BOOSTB. The timing generator 2 controls these operations so that they are carried out efficiently, the second NMOS transistor 18 being turned on only while node N2 is at a boosted potential. When transistor 18 is turned on, moreover, its gate is boosted to a still higher potential, so that charge can be transferred from node N2 to the output terminal 30 with negligible voltage drop. The output terminal 30 thus reaches the same potential VDD+VBOOST−Vt−α as node N2.

Next, the operation in the burn-in mode will be described. The operation of the timing generator 2, level shifter 4, and second driving circuit 6 in the burn-in mode is similar to their operation in the normal mode, and the timing signals TG1 and TG2 and first two driving signals DR1 and DR2 have the same timing waveforms as in the normal mode. The operation of the third driving circuit 8 and the waveforms of the mode signal MODEB and third driving signal DR3 differ from the normal mode.

Figure 4B:
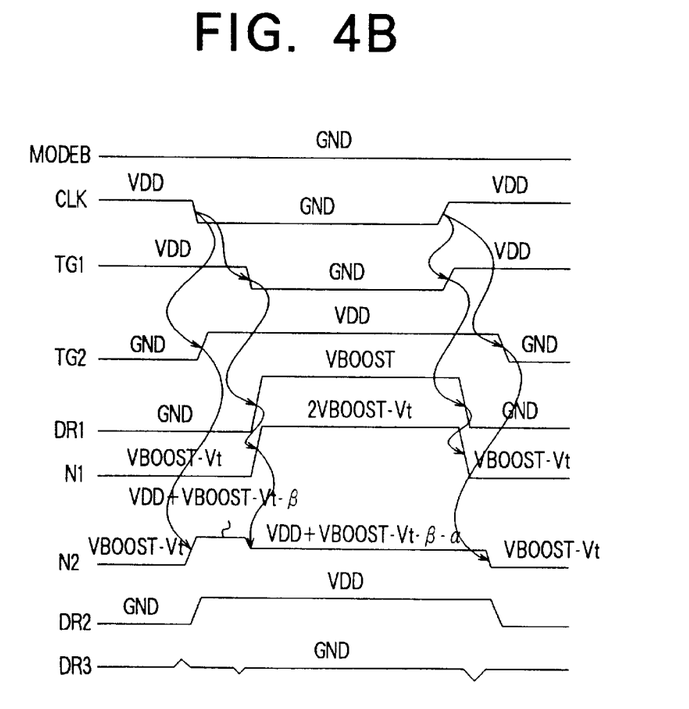
FIG. 4B is a timing diagram illustrating the operation of the first embodiment when the mode signal is in the second state.

Referring to FIG. 4H, when CLK falls from its initial high level to the low level and TG2 is driven high by the timing generator 2, the second driving signal DR2 goes high as in the normal mode. Since the mode signal MODEB is low, however, the output of NAND gate 26 is held low, forcing the third driving signal DR3 to stay at the ground level. Thus while the second (gate) electrode of the second capacitor 12 *is raised to VDD+VBOOST−Vt, the second (gate) electrode of the third capacitor 14 remains at VBOOST−Vt. Since these electrodes are interconnected through node N2, charge is transferred between them, causing both of these electrodes and node N2 to assume an intermediate potential VDD+VBOOST−Vt−β. The value of β is determined by the capacitance ratio of the second and third capacitors 12 and 14. This intermediate potential is still higher than VBOOST−Vt, so the third NMOS transistor 20 turns off.

When TG1 is driven high by the timing generator 2 a short time later, the first driving signal DR1 is driven to the VBOOST level by the level shifter 4, and the potential of node N1 is raised from VBOOST−Vt to 2VBOOST−Vt. Node N1 is now at a higher potential than power-supply line BOOSTB, so the first NMOS transistor 16 turns off.

Due to the voltage-boosting of nodes N1 and N2, the gate potential of NMOS transistor 18 is 2VBOOST−Vt, exceeding the drain potential of VDD+VBOOST−Vt−β by more than Vt, so node N2 discharges through transistor 18, output terminal 30, and BOOSTA to the load (not shown), and node N2 and the output terminal 30 assume a potential equal to VDD+VBOOST−Vt−β−α, where α and β are as described above.

The potential at the output terminal 30 of the first embodiment is therefore boosted less in the burn-in mode than in the normal mode, by an amount β that depends on the capacitance ratio of the second and third capacitors 12 and 14 as noted above. By suitable selection of this capacitance ratio, the circuit designer can arrange for the voltage-boosting circuit to output a potential in the burn-in mode that is high enough for adequate burn-in testing of load circuits, without being so as high as to risk damage to those circuits, even though VDD and VBOOST are higher than during normal operation.

A conventional voltage-boosting circuit of the type referred to earlier is obtained by removing the third driving circuit 8 and third capacitor 14 from the first embodiment, and giving the second capacitor 12 a capacitance value equal to the combined capacitances of the second and third capacitors 12 and 14 in the first embodiment. A conventional voltage-boosting circuit of this type obviously cannot output different boosted potentials in response to a mode signal, or protect load circuits from unintended damage during burn-in tests.

Second Embodiment

In the voltage-boosting circuit of the first embodiment above, since inverter 28 is held in the low output state in the burn-in mode, when node N2 returns from the boosted voltage level (VDD+VBOOST−Vt−β−α) to the unboosted level (VBOOST−Vt), the first (source-drain) electrode of the third capacitor 14 is momentarily pulled down to a level below the ground level, causing a transient undershoot of the third driving signal DR3. There is a possibility that this undershoot might trigger a latch-up in the third driving circuit 8. The second embodiment reduces this possibility.

Figure 5:
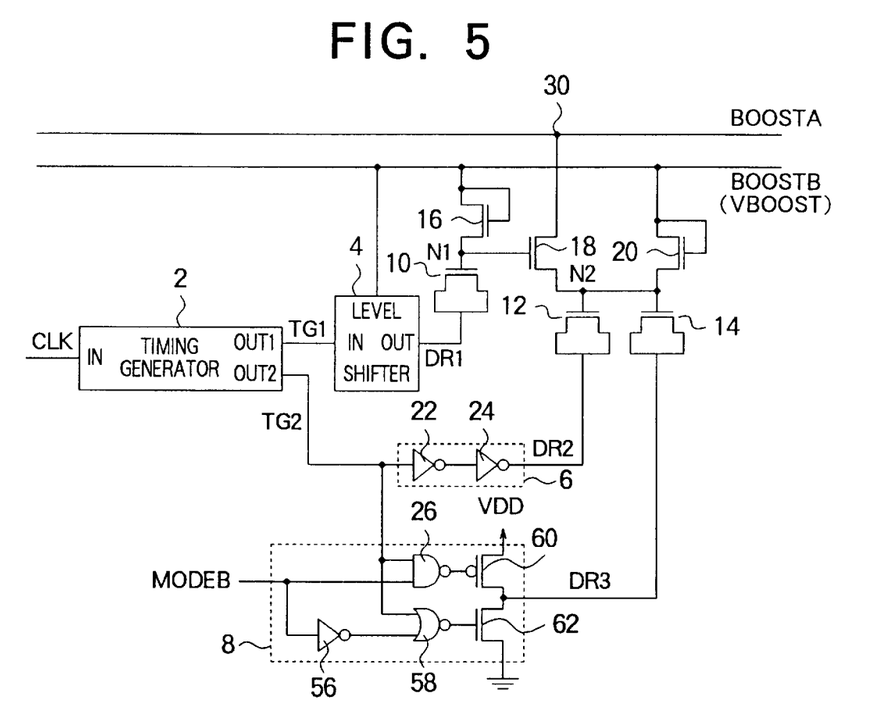
FIG. 5 is a circuit diagram of the second embodiment of the invention.

Referring to FIG. 5, the third driving circuit 8 in the second embodiment comprises NAND gate 26, an inverter 56, a two-input NOR gate 58, a PMOS transistor 60, and an NMOS transistor 62. The other circuit elements in the second embodiment are the same as in the first embodiment.

NAND gate 26 receives the mode signal MODEB and second timing signal TG2 as in the first embodiment. Inverter 56 receives the mode signal MODEB. NOR gate 58 receives timing signal TG2 and the output of inverter 56. The source of PMOS transistor 60 is coupled to the positive power supply VDD, and its gate receives the output of NAND gate 26. The source of NMOS transistor 62 is coupled to ground, and its gate receives the output of NOR gate 58. The drains of both transistors 60 and 62 are mutually interconnected, and their output is the third driving signal DR3 supplied to the third capacitor 14.

The operation of the second embodiment will be described with particular attention to the operation of the third driving circuit 8 and third capacitor 14. The other circuit elements operate as in the first embodiment.

In the normal mode, when MODEB is high and the output of inverter 56 is low, NAND gate 26 and NOR gate 58 both invert the second timing signal TG2. When TG2 is high, NAND gate 26 produces a Low output, turning on PMOS transistor 60, and NOR gate 58 also produces a low output, turning off NMOS transistor 62. The third driving signal DR3 is accordingly driven high. Conversely, when TG2 is low and the output of inverter 56 is high, the output of NAND gate 26 is high, turning off PMOS transistor 60, and the output of NOR gate 58 is high, turning on NMOS transistor 62. The third driving signal DR3 is accordingly driven low. The third driving circuit 8 and third capacitor 14 thus operate as they did in the first embodiment, and the output terminal 30 is boosted to VDD+VBOOST−Vt−α.

In the burn-in mode, since MODEB is low, the output of NAND gate 26 is high, turning off PMOS transistor 60, regardless of the state of the second timing signal TG2. Since the output of inverter 56 is high, the output of NOR gate 58 is low, turning off NMOS transistor 62, again regardless of TG2. The third driving signal DR3 therefore floats with respect to VDD and ground. The burn-in mode is preferably entered by driving MODEB low at a time when the clock signal CLK is high, so that the initial level of the third driving signal DR3 is the ground Level.

Figure 6:
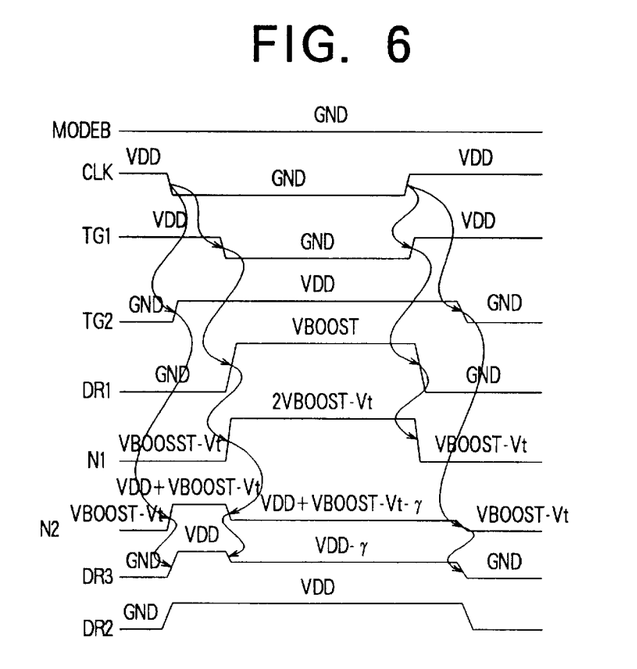
FIG. 6 is a timing diagram illustrating the operation of the second embodiment when the mode signal is in the second state.

Referring to FIG. 6, when CLK falls from the high level to the low level in the burn-in mode and TG2 is driven high by the timing generator 2, the second driving signal DR2 is driven to the VDD level by inverters 22 and 24, boosting the second (gate) electrode of the second capacitor 12 from VBOOST−Vt to VDD+VBOOST−Vt as in the first embodiment. Since the third driving signal DR3 is free to float, the second (gate) electrode of the third capacitor 14 assumes the same potential VDD+VBOOST−Vt, and the DR3 potential rises from ground to VDD. Node N2 is now at a potential of VDD+VBOOST−Vt, so the third NMOS transistor 20 turns off.

After a short delay, TG1 goes high, the first driving signal DR1 is driven to the VBOOST level, and node N1 is boosted from VBOOST−Vt to 2VBOOST−Vt as in the first embodiment, turning off the first NMOS transistor 16 and turning on the second NMOS transistor 18. The charge at node N2 is therefore supplied through transistor 18, output terminal 30, and voltage output line BOOSTA to the load (not shown), reducing the potential of node N2.

As the potential of node N2 falls in the burn-in mode, the floating potential of the third driving signal DR3 also falls, so the output terminal 30 is not boosted to as high a potential as in the normal mode. Node N2, output terminal 30, and BOOSTA assume a potential of VDD+VBOOST−Vt−γ, where γ>α, and DR3 assumes a potential of VDD−γ. The value of γ is determined by the load impedance and the capacitance value of the second capacitor 12.

Next CLK goes high, TG1 goes high, the first driving signal DR1 goes low, and the potential of node N1 is reduced from 2VBOOST−Vt to BOOST−Vt. When TG2 goes low a short time later, the second driving signal DR2 goes low and node N2 returns from VDD+VBOOST−Vt−γ to VBOOST−Vt. The third driving signal DR3 follows by returning from VDD−γ to ground, without undershooting the ground level.

By allowing the third driving signal DR3 to float in the burn-in mode, the second embodiment provides the same desirable effect as the first embodiment, boosting the voltage at the output terminal 30 by less in the burn-in mode than in the normal mode. In addition, since DR3 is free to follow the potential changes at node N2 in the burn-in mode, in principle DR3 is not forced below the ground level, and the possibility of latch-up is reduced.

Third Embodiment

In the course of extended continuous operation in the burn-in mode in the second embodiment, although in prin-ciple the third driving signal DR3 floats at levels ranging from ground to VDD, in practice DR3 may drift below ground level, due to further charging of the third capacitor 14 from power-supply line BOOSTB. Such further charging can occur while node N2 is returning from VDD+VBOOST−Vt−γ to VBOOST−Vt, particularly if the value of γ is large. The third embodiment addresses this possibility.

Figure 7:
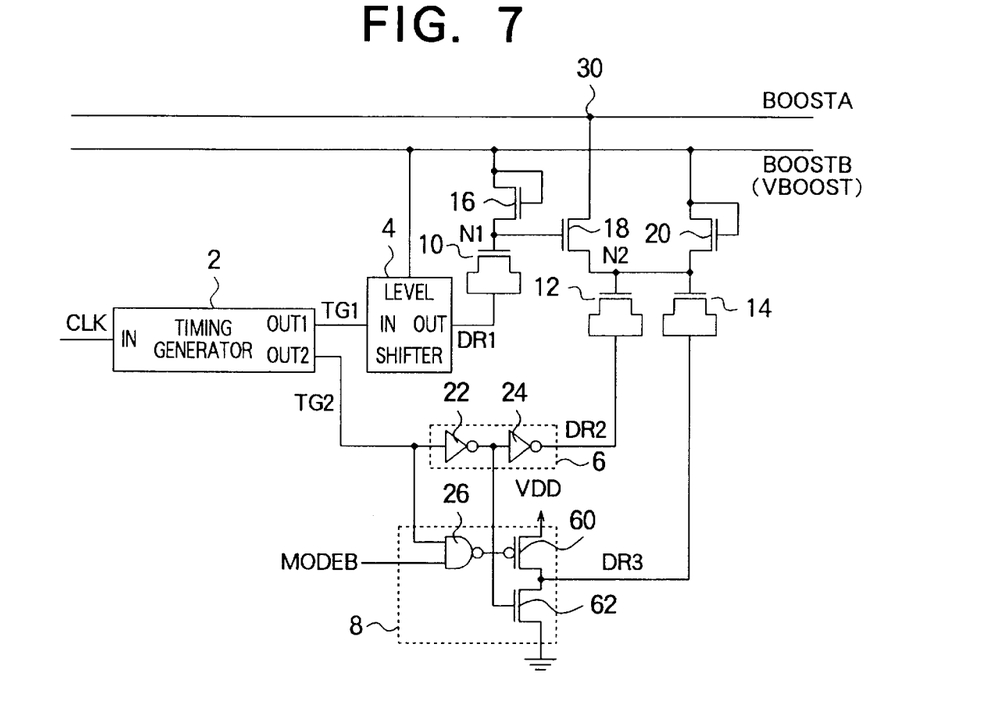
FIG. 7 is a circuit diagram of a third embodiment of the invention.

Referring to FIG. 7, the third driving circuit 8 of the third embodiment comprises the NAND gate 26, PMOS transistor 60, and NMOS transistor 62 of the second embodiment, without the inverter 56 and NOR gate 58. The gate of NMOS transistor 62 is now driven by inverter 22 in the second driving circuit 6. The other circuit elements of the third embodiment are the same as in the first and second embodiments.

The operation of the third embodiment will be described with particular attention to the operation of the third driving circuit 8 and third capacitor 14. The other circuit elements operate as in the first embodiment.

In the normal mode, when the mode signal MODEB is high, the outputs of inverter 22 and NAND gate 26 are identical. When the second timing signal TG2 is high, both of these outputs are low, so PMOS transistor 60 is turned on, NMOS transistor 62 is turned off, and the third driving signal DR3 is driven to the VDD level. When the second timing signal TG2 is low, the outputs of inverter 22 and NAND gate 26 are both high, so PMOS transistor 60 is turned off, NMOS transistor 62 is turned on, and the third driving signal DR3 is driven to the ground level. In short, in the normal mode the third embodiment operates as did the first and second embodiments, boosting the output terminal 30 to a potential of VDD+VBOOST−Vt−α.

In the burn-in mode, when MODEB is low, the output of NAND gate 26 is high regardless of the state of TG2, so PMOS transistor 60 is always turned off. When TG2 is low, the output of inverter 22 is high and NMOS transistor 62 is turned on, forcing the third driving signal DR3 to the ground level. When TG2 is high, the output of inverter 22 is low arid NMOS transistor 62 is turned off, so DR3 floats with respect to VDD and ground.

Figure 8:
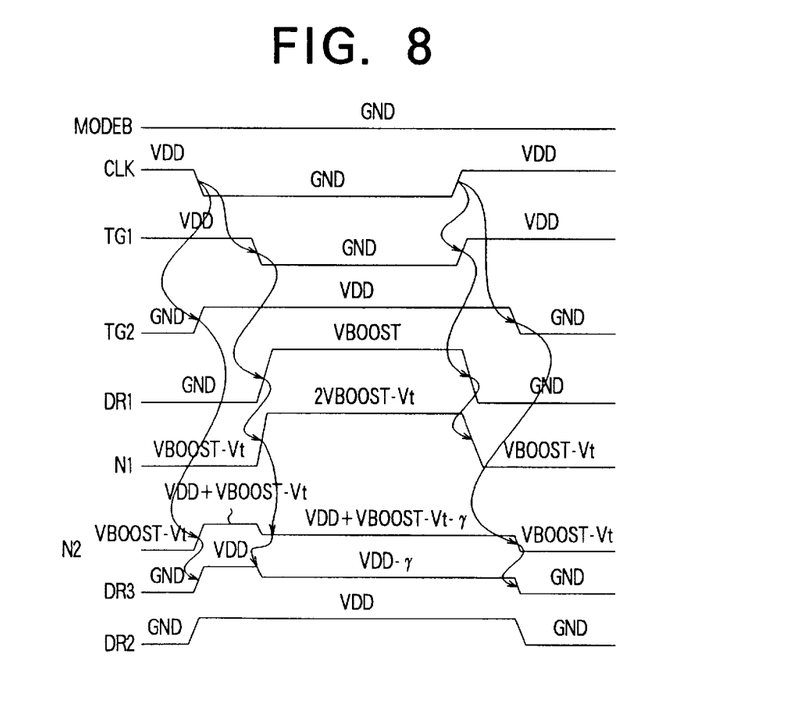
FIG. 8 is a timing diagram illustrating the operation of the third embodiment when the mode signal is in the second state.

FIG. 8 shows timing waveforms of the third embodiment in the burn-in mode. All of these waveforms are the same as in the second embodiment (FIG. 6). In particular, when TG2 is high, DR3 first rises to VDD, then falls back to VDD−γ, following the potential changes at node N2.

The difference between the second and third embodiments is that when TG2 goes low in the burn-in mode, DR3 is driven to the ground level by NMOS transistor 62, instead of being left free to float responsive to the potential changes at node N2. Accordingly, even if the third embodiment operates for an extended period in the burn-in mode, DR3 will return to the ground level once in every clock cycle, and will not drift below the ground level.

The third embodiment accordingly provides the same effects as the second embodiment, but with still better protection against undershoot and Latch-up, particularly during long burn-in tests.

Fourth Embodiment

Figure 9:
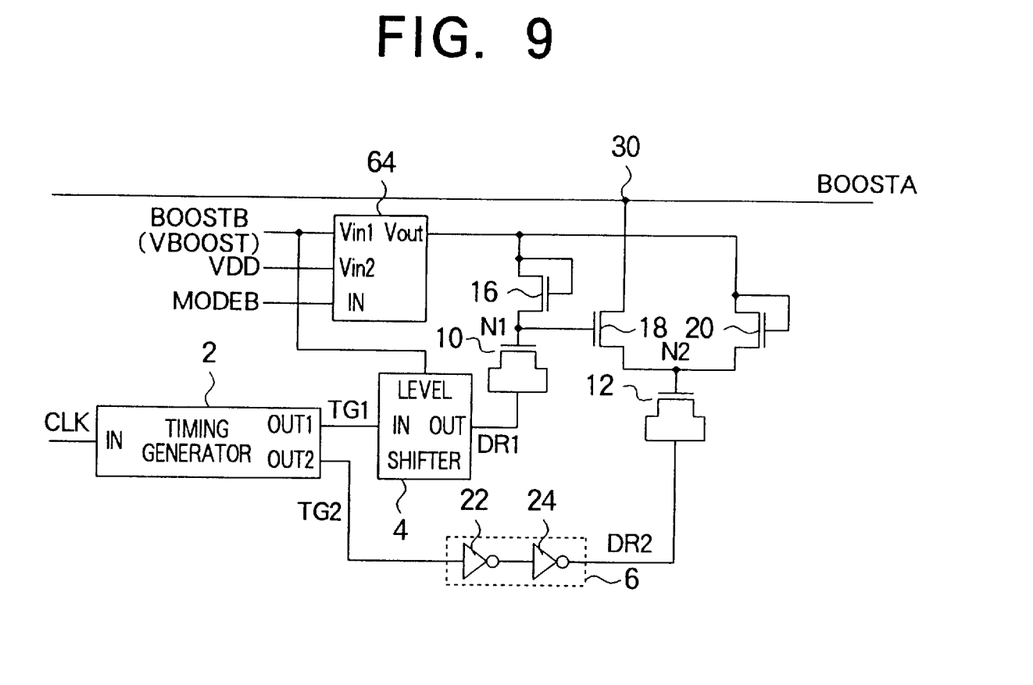
FIG. 9 is a circuit diagram of a fourth embodiment of the invention.

As an example of the second aspect of the invention, FIG. 9 shows a fourth embodiment. The fourth embodiment comprises a timing generator 2, level shifter 4, second driving circuit 6, first and second capacitors 10 and 12, and first, second, and third NMOS transistors 16, 18, and 20, which are similar to the corresponding elements in the first embodiment. The capacitance of the second capacitor 12, however, is equal to the combined capacitance of the second and third capacitors 12 and 14 in the first embodiment.

The fourth embodiment also has a power-supply switching circuit 64 with a first voltage input terminal Vin1 that receives VBOOST from power-supply line BOOSTB, a second voltage input terminal Vin2 that receives VDD, a mode signal input terminal IN that receives the mode signal MODEB, and a voltage output terminal Vout. The voltage output from Vout is supplied to the drains and gates of the first and third NMOS transistors 16 and 20.

Figure 10:
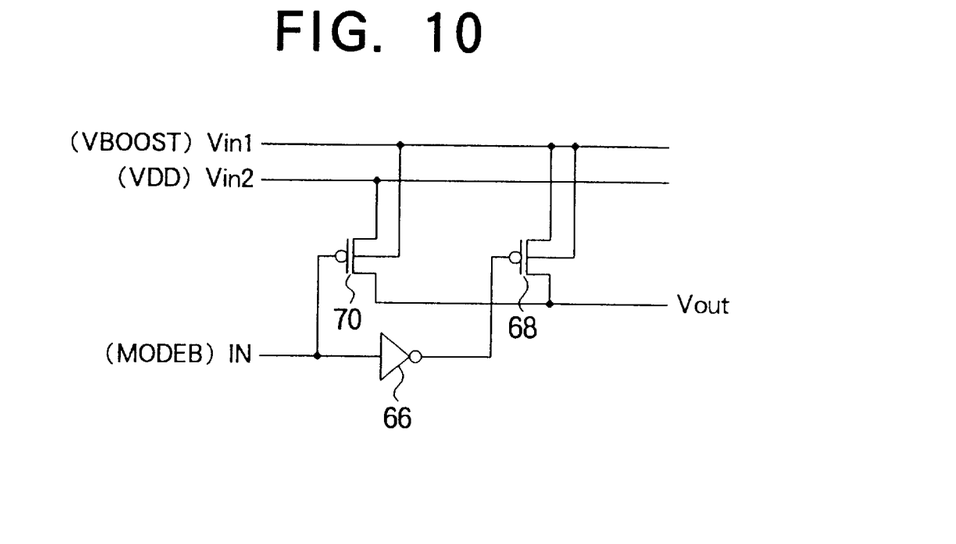
FIG. 10 is a circuit diagram of the power-supply switching circuit employed in the fourth and fifth embodiments.

Referring to FIG. 10, the power-supply switching circuit 64 comprises an inverter 66 that receives the mode signal MODEB from input terminal IN, and PMOS transistors 68 and 70. PMOS transistor 68 has its source (and substrate bulk or well) coupled to the first voltage input terminal Vin1, its gate coupled to the output terminal of inverter 66, and its drain coupled to the voltage output terminal Vout of the power-supply switching circuit 64. PMOS transistor 70 has its source coupled to the second voltage input terminal Vin2, its substrate bulk or well coupled to Vin1, its gate coupled to the mode signal. input terminal IN, and its drain coupled to Vout.

Inverter 66 is adapted so that its output is at the ground level when the mode signal MODEB is high, and at the VBOOST level when MODEB is low. Inverter 66 has, for example, the same structure as the level shifter 4, shown in FIG. 3. When MODEB is high, accordingly, PMOS transistor 68 is turned on, PMOS transistor 70 is turned off, and the VBOOST potential is supplied to the output terminal Vout. When MODEB is low, PMOS transistor 68 is turned off, PMOS transistor 70 is turned on, and the VDD potential is supplied to the output terminal Vout.

Next, the operation of the fourth embodiment will be described.

In the normal mode, when MODEB is high and the power-supply switching circuit 64 outputs VBOOST, the fourth embodiment operates in the same way as the first embodiment, with the second driving signal DR2 in the fourth embodiment performing the combined function of the second and third driving signals DR2 and DR3 in the first embodiment, and the second capacitor 12 in the fourth embodiment performing the combined function of the second and third capacitors 12 and 14 in the first embodiment. The timing waveforms and voltage levels are the same as in FIG. 4A. The output terminal 30 and voltage supply line BOOSTA are boosted to a potential of VDD+VB00ST-Vt-α.

Figure 11:
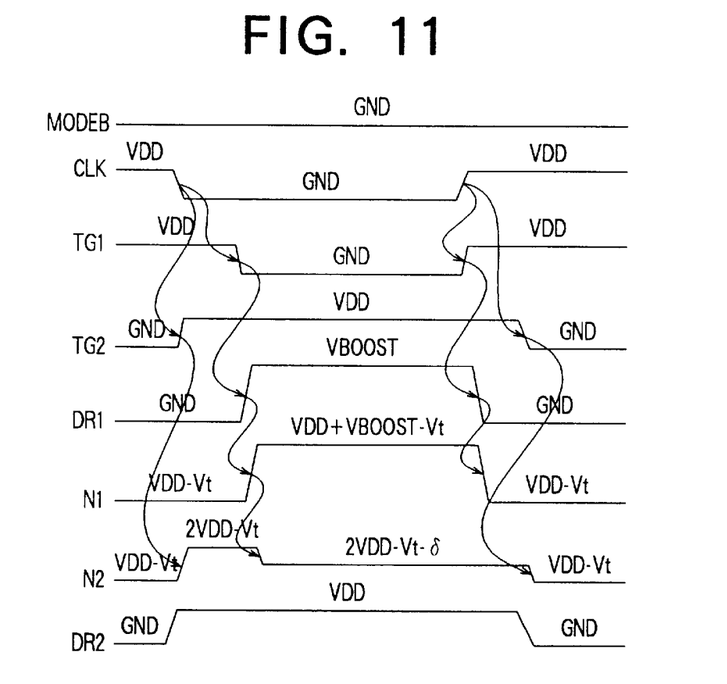
FIG. 11 is a timing diagram illustrating the operation of the fourth embodiment when the mode signal is in the second state.

In the burn-in mode, when MODEB is low and the power-supply switching circuit 64 outputs VDD, the fourth embodiment operates as illustrated in FIG. 11. The operation of the level shifter 4, timing generator 2, and second driving circuit 6 is the same as in the normal mode.

Initially the clock signal CLK is high, and both driving signals DR1 and DR2 are low. The drains and gates of the first and third NMOS transistors 16 and 20 are at the same potential, so a voltage drop of Vt occurs in each, and nodes N1 and N2 are both charged to VDD-Vt by the VDD output of the power-supply switching circuit 64. The drain and gate of the second NMOS transistor 18 are also at the same potential, so a voltage drop of Vt occurs between the source and drain of this transistor 18, and the potential of the output terminal 30 is boosted no higher than VDD-2Vt.

When CLK goes low and timing signal TG2 goes high, the second driving signal DR2 is driven to the VDD level by inverters 22 and 24, and the potential of node N2 is raised from VDD-Vt to 2VDD-Vt. Node N2 is now at a higher potential than power-supply output terminal Vout (VDD), so the third NMOS transistor 20 turns off.

When timing signal TG1 goes low a short time later, the first driving signal DR1 is driven to the VBOOST level by the level shifter 4. The potential of node N1 is thereby raised from VDD-Vt to VDD+VBOOST-Vt. Node N1 is now at a higher potential than Vout (VDD), so the first NMOS transistor 16 turns off.

Due to the voltage-boosting of nodes N1 and N2, the gate potential (VDD+VBOOST-Vt) of the second NMOS transistor 18 exceeds the drain potential (2VDD-Vt) by more than Vt. The charge at node N2 is therefore supplied through transistor 18, output terminal 30, and BOOSTA to the load (not shown), with substantially no voltage drop in transistor 18. The potential of the output terminal 30 is thereby boosted, but since node N2 is at a lower potential (2VDD-Vt) than in the normal mode (where node N2 was at VDD+VBOOST-Vt), the output terminal 30 is not boosted as high as in the normal mode. Node N2, output terminal 30, and BOOSTA all reach a potential equal to 2VDD-Vt-δ, where δ is determined by the capacitance of capacitor 12 and the load impedance. If the capacitance of capacitor 12 is equal to the combined capacitance of capacitors 12 and 14 in the first embodiment circuit, then δ is equal to α.

When CLK next goes high, TG1 immediately goes high, the first driving signal DR1 goes low, and node N1 returns from VDD+VBOOST-Vt to VDD-Vt. When TG2 goes low a short time later, the second driving signal DR2 also goes low, and the potential of node N2 returns from 2VDD-Vt-δ to VDD-Vt. In this state the second NMOS transistor 18 turns off, leaving the output terminal 30 and BOOSTA at the boosted potential of 2VDD-Vt-δ.

The fourth embodiment accordingly has an effect similar to that of the preceding embodiments, the output terminal 30 being boosted less in the burn-in mode than in the normal mode. In addition, the possibility of latch-up in the third driving circuit that existed in the preceding embodiments is eliminated, because the third driving circuit itself is eliminated.

Fifth Embodiment

Figure 12:
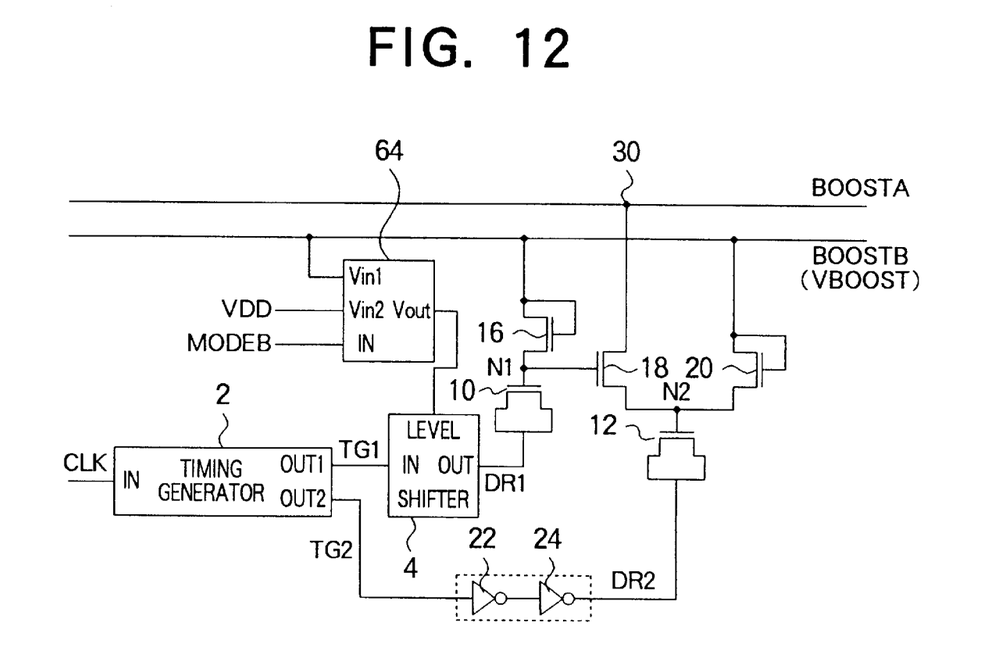
FIG. 12 is a circuit diagram of the fifth embodiment of the invention.

As an illustration of the third aspect of the invention, FIG. 12 shows a fifth embodiment. The fifth embodiment has the same circuit elements as the fourth embodiment, but connects the output terminal Vout of the power-supply switching circuit 64 to the sources of PMOS transistors 42, 44, and 52 in the level shifter 4, shown in FIG. 3, rather than to the drains and gates of NMOS transistors 16 and 20. The drains and gates of NMOS transistors 16 and 20 are coupled to power-supply line BOOSTB and receive the VBOOST potential, as in the first embodiment.

Next the operation of the fifth embodiment will be described.

In the normal mode, when MODEB is high and the power-supply switching circuit 64 outputs VBOOST, the fifth embodiment operates in the same way as the fourth embodiment, boosting the output terminal 30 to a potential of VDD+VBOOST-Vt-α.

Figure 13:
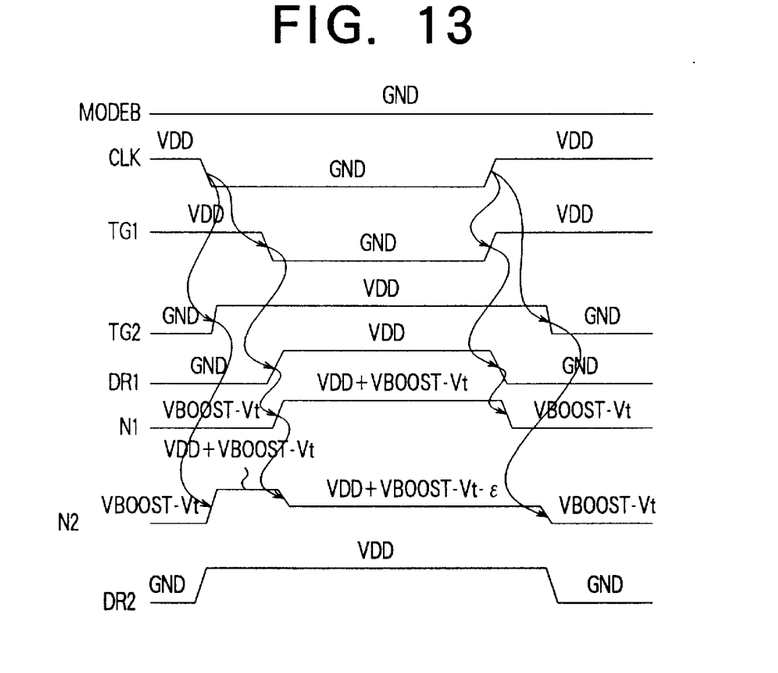
FIG. 13 is a timing diagram illustrating the operation of the fifth embodiment when the mode signal is in the second state.

In the burn-in mode, when MODEB is low and the power-supply switching circuit 64 outputs VDD, the fifth embodiment operates as illustrated in FIG. 13.

Initially the clock signal CLK is high, the driving signals DR1 and DR2 are low, nodes N1 and N2 are both at a potential of VBOOST-Vt, and the output terminal is at a potential of VBOOST-2Vt, as in the first embodiment.

When CLK goes low and TG2 goes high, the second driving signal DR2 is driven from the ground level to the VDD level by inverters 22 and 24, raising the potential of node N2 from VBOOST−Vt to VDD+VBOOST−Vt. Node N2 is now at a higher potential than BOOSTB, so transistor 20 turns off.

When timing signal TG1 goes high a short time later, the first driving signal DR1 is driven from the ground level to VDD by the Level shifter 4. DR1 is not driven to VBOOST as in the first embodiment, because the level shifter 4 receives VDD instead of VBOOST from the power-supply switching circuit 64. The potential of node N1 is thereby raised from VBOOST−Vt to VDD+VBOOST−Vt. Node N1 is now at a higher potential than VBOOST, so NMOS transistor 16 turns off.

Due to the above voltage-boosting of nodes N1 and N2, the gate and drain potentials of the second NMOS transistor 18 are both equal to VDD+VBOOST−Vt, while its source potential is VBOOST−2Vt. Under these conditions transistor 18 turns on, and charge is transferred from node N2 through transistor 18, output terminal 30, and BOOSTA to the load (not shown), but since the gate potential of transistor 18 is not as high as in the normal mode, a voltage drop occurs between the source and drain of transistor 18, and less charge can be transferred than in the normal mode. The transfer of charge reduces the potential of node N2 to VDD+VBOOST−Vt−ε, where ε depends on the capacitance of capacitor 12 and the load impedance. If ε is small, the potential of the output terminal 30 and voltage output line BOOSTA rises to substantially VDD+VBOOST−2Vt−ε.

Like the fourth embodiment, the fifth embodiment boosts the potential of the output terminal 30 by less in the burn-in mode than in the normal mode, without requiring a third driving circuit.

Sixth Embodiment

Figure 14:
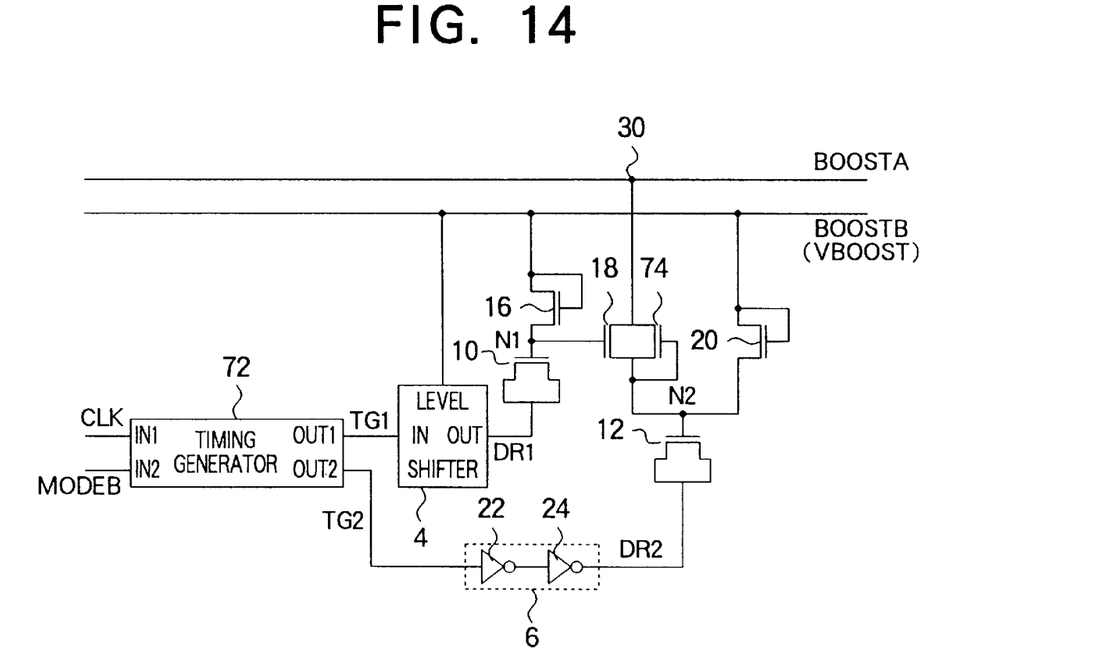
FIG. 14 is a circuit diagram of the sixth embodiment of the invention.

As an example of the fourth aspect of the invention, FIG. 14 shows a sixth embodiment. The sixth embodiment eliminates the power-supply switching circuit 64 of the fifth embodiment, provides a different timing generator 72, and adds a fourth NMOS transistor 74. This transistor 74 is coupled in parallel with the second NMOS transistor 18 between node N2 and the output terminal 30. Both the drain and gate of transistor 74 are coupled to node N2.

Figure 15:
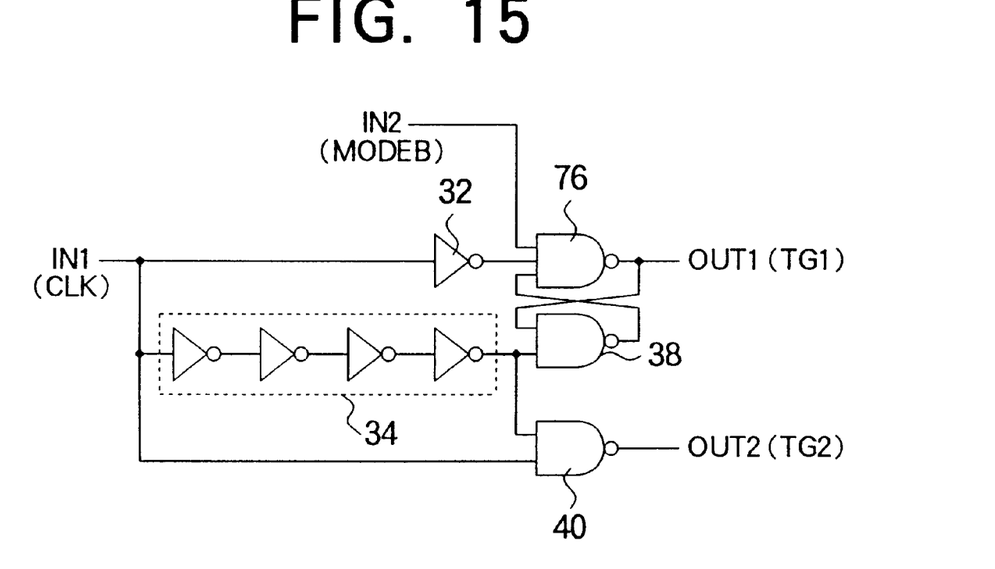
FIG. 15 is a circuit diagram of the timing generator employed in the sixth embodiment.

FIG. 15 is a circuit diagram of the timing generator 72 in the sixth embodiment. This timing generator 72 has the same inverter 32, delay line 34, and NAND gates 38 and 40 as the timing generator 2 in the preceding embodiments, shown in FIG. 2, but replaces the two-input NAND gate 36 of that timing generator 2 with a three-input NAND gate 76. NAND gate 76 receives the mode signal MODEB as well as the outputs of inverter 32 and NAND gate 38. The output of NAND gate 76 Ls the first timing signal TG1.

Next, the operation of the sixth embodiment will be described.

In the normal mode, when MODEB is high, the timing generator 72 operates exactly as did the timing generator 2 in the preceding embodiments, and the resulting timing waveforms and voltage levels are as shown in FIG. 4A. The only difference between the sixth embodiment and the preceding embodiments in the normal mode is that even when the second transistor 12 is turned off in the sixth embodiment, node N2 is able to supply charge to the output terminal 30 through the fourth NMOS transistor 74. Since the gate and drain of transistor 74 are at the same potential, however, this charge transfer is accompanied by a voltage drop of Vt, and the initial potential of the output terminal 30 and BOOSTA is still VBOOST−2Vt.

In the short interval between the rise of timing signal TG2 and the fall of timing signal TG1, after the potential of node N2 is raised but before the second NMOS transistor 18 turns on, node N2 discharges through the fourth NMOS transistor 74, and the potential at the output terminal 30 begins to rise while the potential at node N2 begins to fall. When TG1 goes low and the second NMOS transistor 18 turns on, the discharge continues, first through both NMOS transistors 18 and 74, then through transistor 18 alone, until node N2 and the output terminal 30 are at the same potential of VDD+VBOOST−Vt−α. After the second NMOS transistor 18 is turned off and nodes N1 and N2 have returned to VBOOST−Vt, the drains and gates of both the second and fourth NMOS transistors 18 and 74 are at the same potential as node N2, preventing current fLow from the output terminal 30 to node N2. Escape of charge from BOOSTA back to node N2 is therefore prevented as in the preceding embodiments.

Figure 16:
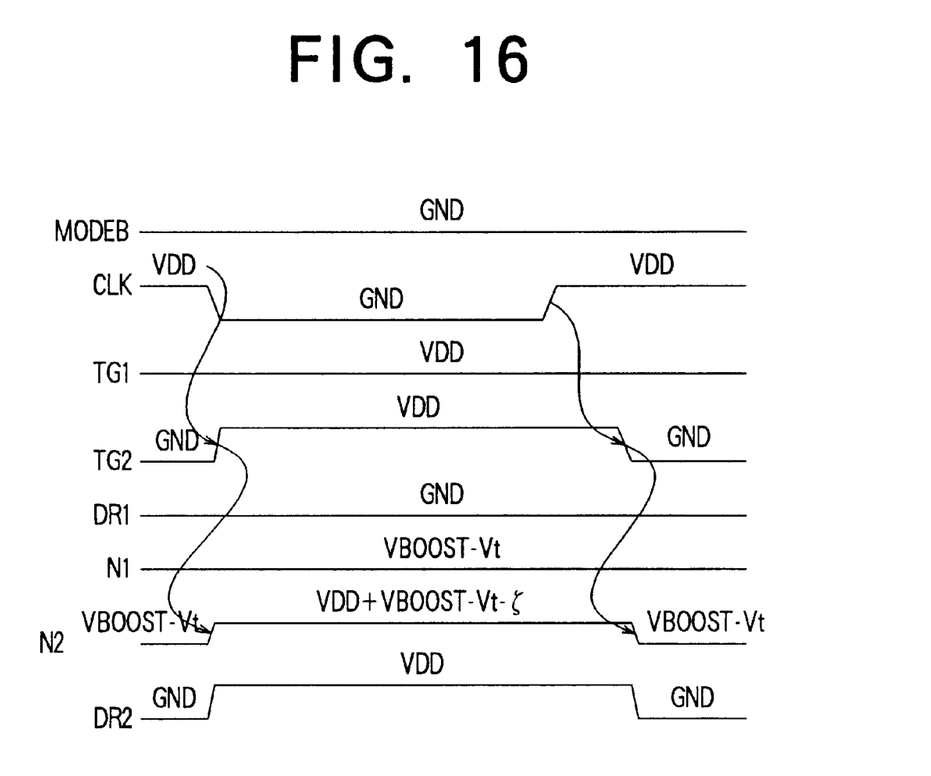
FIG. 16 is a timing diagram illustrating the operation of the sixth embodiment when the mode signal is in the second state.

In the burn-in mode, when MODEB is low, NAND gate 76 in the timing generator 72 is held in the high output state, so the first timing signal TG1 remains high and the first driving signal DR1 remains Low, as shown in FIG. 16. The potential of node N1 therefore remains at VBOOST−Vt. As a result, once the potential of the output terminal 30 is boosted above VBOOST−2Vt, the second NMOS transistor 18 turns off, and as long as the output terminal 30 remains at a potential above VBOOST−2Vt, the second NMOS transistor 18 remains turned off.

Initially the clock signal CLK is high, timing signal TG2 is low, the second driving signal DR2 is low, and node N2 is charged through NMOS transistor 20 to VBOOST−Vt as in the preceding embodiments. When CLK goes low and TG2 and DR2 both go high, node N2 is boosted from VBOOST−Vt toward VDD+VBOOST−Vt, but charge is transferred from node N2 through the fourth NMOS transistor 74, output terminal 30, and voltage output line BOOSTA to the load (not shown), so node N2 reaches a potential of VDD+VBOOST−Vt−ζ, the value of ζ depending on the load impedance and the capacitance of the second capacitor 12.

Because of the voltage drop in the fourth NMOS transistor 74, the potentials of node N2 and the output terminal 30 cannot be equalized; the potential of the output terminal 30 stops rising at VDD+VBOOST−2Vt−ζ, lower by Vt than the potential of node N2. The output terminal 30 is therefore boosted by Less in the burn-in mode than in the normal mode.

When CLK goes high again, TG2 and DR2 return to the low level and the potential of node N2 returns to VBOOST−Vt. As in the normal mode, escape of charge from voltage output line BOOSTA to node N2 through transistors 18 and 74 is prevented because the gates of these transistors are both at the same potential as node N2.

Like the preceding embodiments, the sixth embodiment boosts the potential of the output terminal 30 and voltage output line BOOSTA by one amount in the normal mode, and by a smaller amount in the burn-in mode. Moreover, the sixth embodiment requires only minor changes to conventional voltage-boosting circuit designs, these changes being the addition of the fourth NMOS transistor 74 and the replacement of a two-input NAND gate by a three-input NAND gate in the timing generator 72.

The preceding embodiments have been shown as examples and are not intended to limit the scope of the invention. The structures of the timing generators 2 and 72 are not limited to the structures shown in FIGS. 2 and 15. The structure of the level shifter 4 is riot limited to the structure shown in FIG. 3. The structure of the power-supply switching circuit 64 is not limited to the structure shown in FIG. 10. The structures of the second and third driving circuits are not limited to the structures shown in FIGS. 1, 5, 7, 9, 12, and 14. Any or all of the signal polarities may be reverse to what is shown in the drawings.

To mention just one possible modification, in the third embodiment, the gate of NMOS transistor 60 in the third driving circuit 8 could be driven by an additional inverter provided in that driving circuit 8 to invert timing signal TG2, instead of being driven from inverter 22 in the second driving circuit 6.

Those skilled in the art will recognize that other modifications are possible within the scope of the invention as claimed below.

What is claimed is:

1. A voltage-boosting circuit receiving a first potential, a second potential, a third potential, a clock signal, and a mode signal, the second potential being intermediate between the first potential and the third potential, the clock signal alternating between a first level and a second level, and the mode signal having a first state and a second state, comprising:

an output terminal;

a timing generator receiving said clock signal, generating a first timing signal having an active state and an inactive state, and generating a second timing signal having an active state and an inactive state, said first timing signal going to the active state a certain time after said clock signal goes to said first level, said first timing signal going to the inactive state when said clock signal goes to said second level, said second timing signal going to the active state when said clock signal goes to said first level, and said second timing signal going to the inactive state a certain time after said clock signal goes to said second level;

a first driving circuit coupled to said timing generator, outputting a first driving signal at said first potential when said first timing signal is in the inactive state, and outputting said first driving signal at said third potential when said first timing signal is in the active state;

a second driving circuit coupled to said timing generator, outputting a second driving signal at said first potential when said second timing signal is in the inactive state, and outputting said second driving signal at said second potential when said second timing signal is in the active state;

a third driving circuit coupled to said timing generator, outputting a third driving signal at said first potential when said mode signal is in the first state and said second timing signal is in the inactive state, and outputting said third driving signal at said second potential when said mode signal is in the first state and said second timing signal is in the active state, output of said third driving signal being disabled when said mode signal is in the second state;

a first capacitor coupled to said first driving circuit, having a first electrode and a second electrode, the first electrode of said first capacitor receiving said first driving signal;

a second capacitor coupled to said second driving circuit, having a first electrode and a second electrode, the first electrode of said second capacitor receiving said second driving signal;

a third capacitor coupled to said third driving circuit, having a first electrode and a second electrode, the first electrode of said third capacitor receiving said third driving signal, and the second electrode of said third capacitor being coupled to the second electrode of said second capacitor;

a first switching element coupled to the second electrode of said first capacitor, supplying said third potential to said first capacitor, but preventing said first capacitor from discharging to said third potential;

a second switching element coupled to the second electrode of said first capacitor, the second electrode of said second capacitor, and said output terminal, allowing said second capacitor and said third capacitor to discharge to said output terminal when the second electrode of said second capacitor is at a potential intermediate between said first potential and a potential of the second electrode of said first capacitor, and preventing said second capacitor and said third capacitor from being charged from said output terminal when the second electrode of said first capacitor and the second electrode of said second capacitor are at equal potentials; and a third switching element coupled to the second electrode of said second capacitor, supplying said third potential to said second capacitor and said third capacitor, but preventing said second capacitor and said third capacitor from discharging to said third potential.

2. The voltage-boosting circuit of claim 1, wherein said third driving circuit holds said third driving signal at said first potential when output of said third driving signal is disabled.

3. The voltage-boosting circuit of claim 1, wherein said third driving circuit holds said third driving signal in a floating state with respect to said first potential and said second potential when output of said third driving signal is disabled.

4. The voltage-boosting circuit of claim 1, wherein said third driving circuit holds said third driving signal at said first potential when said second timing signal is in the inactive state and output of said third driving signal is disabled, and holds said third driving signal in a floating state with respect to said first potential and said second potential when said second timing signal is in the active state and output of said third driving signal is disabled.

5. The voltage-boosting circuit of claim 1, wherein said first capacitor, said second capacitor, and said third capacitor are metal-oxide-semiconductor capacitors.

6. The voltage-boosting circuit of claim 1, wherein said first switching element, said second switching element, and said third switching element are field-effect transistors.

7. The voltage-boosting circuit of claim 6, wherein said first switching element has a source coupled to the second electrode of said first capacitor, and a gate and drain receiving said third potential.

8. The voltage-boosting circuit of claim 6, wherein said second switching element has a source coupled to said output terminal, a gate coupled to the second electrode of said first capacitor, and a drain coupled to the second electrode of said second capacitor.

9. The voltage-boosting circuit of claim 6, wherein said third switching element has a source coupled to the second electrode of said second capacitor, and a gate and drain receiving said third potential.

10. A voltage-boosting circuit receiving a first potential, a second potential, a third potential, a clock signal, and a mode signal, the second potential being intermediate between the first potential and the third potential, the clock signal alternating between a first level and a second level, and the mode signal having a first state and a second state, comprising:

an output terminal;

a power-supply switching circuit receiving said second potential, said third potential., and said mode signal, outputting a potential equal to said third potential when said mode signal is said first state, and outputting a potential equal to said second potential when said mode signal is in said second state;

a timing generator receiving said clock signal, generating a first timing signal having an active state and an inactive state, and generating a second timing signal having an active state and an inactive state, said first timing signal going to the active state a certain time after said clock signal goes to said first level, said first timing signal going to the inactive state when said clock signal goes to said second level, said second timing signal going to the active state when said clock signal goes to said first level, and said second timing signal going to the inactive state a certain time after said clock signal goes to said second level;

a first driving circuit coupled to said timing generator, outputting a first driving signal at said first potential when said first timing signal is in the inactive state, and outputting said first driving signal at said third potential when said first timing signal is in the active state;

a second driving circuit coupled to said timing generator, outputting a second driving signal at said first potential when said second timing signal is in the inactive state, and outputting said second driving signal at said second potential when said second timing signal is in the active state;

a first capacitor coupled to said first driving circuit, having a first electrode and a second electrode, the first electrode of said first capacitor receiving said first driving signal;

a second capacitor coupled to said second driving circuit, having a first electrode and a second electrode, the first electrode of said second capacitor receiving said second driving signal;

a first switching element coupled to said power-supply switching circuit and to the second electrode of said first capacitor, supplying the potential output by said power-supply switching circuit to said first capacitor, but preventing said first capacitor from discharging to said power-supply switching circuit;

a second switching element coupled to the second electrode of said first capacitor, the second electrode of said second capacitor, and said output terminal, allowing said second capacitor to discharge to said output terminal when the second electrode of said second capacitor is at a potential intermediate between said first potential and a potential of the second electrode of said first capacitor, and preventing said second capacitor from being charged from said output terminal when the second electrode of said first capacitor and the second electrode of said second capacitor are at equal potentials; and a third switching element coupled to said power-supply switching circuit and to the second electrode of said second capacitor, supplying the potential output by said power-supply switching circuit to said second capacitor, but preventing said second capacitor from discharging to said power-supply switching circuit.

11. The voltage-boosting circuit of claim 10, wherein said first capacitor and said second capacitor are metal-oxide-semiconductor capacitors.

12. The voltage-boosting circuit of claim 10, wherein said first switching element, said second switching element, and said third switching element are field-effect transistors.

13. The voltage-boosting circuit of claim 12, wherein said first switching element has a source coupled to the second electrode of said first capacitor, and a gate and drain receiving the potential output by said power-supply switching circuit.

14. The voltage-boosting circuit of claim 12, wherein said second switching element has a source coupled to said output terminal, a gate coupled to the second electrode of said first capacitor, and a drain coupled to the second electrode of said second capacitor.

15. The voltage-boosting circuit of claim 12, wherein said third switching element has a source coupled to the second electrode of said second capacitor, and a gate and drain receiving the potential output by said power-supply switching circuit.

16. A voltage-boosting circuit receiving a first potential, a second potential, a third potential, a clock signal, and a mode signal, the second potential being intermediate between the first potential and the third potential, the clock signal alternating between a first level and a second level, and the mode signal having a first state and a second state, comprising:

an output terminal;

a power-supply switching circuit receiving said second potential, said third potential, and said mode signal, outputting a potential equal to said third potential when said mode signal is said first state, and outputting a potential equal to said second potential when said mode signal is in said second state;

a timing generator receiving said clock signal, generating a first timing signal having an active state and an inactive state, and generating a second timing signal having an active state and an inactive state, said first timing signal going to the active state a certain time after said clock signal goes to said first level, said first timing signal going to the inactive state when said clock signal goes to said second level, said second timing signal going to the active state when said clock signal goes to said first level, and said second timing signal going to the inactive state a certain time after said clock signal goes to said second level;

a first driving circuit coupled to said power-supply switching circuit and said timing generator, outputting a first driving signal at said first potential when said first timing signal is in the inactive state, and outputting said first driving signal at the potential output by said powersupply switching circuit when said first timing signal is in the active state;

a second driving circuit coupled to said timing generator, outputting a second driving signal at said first potential when said second timing signal is in the inactive state, and outputting said second driving signal at said second potential when said second timing signal is in the active state;

a first capacitor coupled to said first driving circuit, having a first electrode and a second electrode, the first electrode of said first capacitor receiving said first driving signal;

a second capacitor coupled to said second driving circuit, having a first electrode and a second electrode, the first electrode of said second capacitor receiving said second driving signal;

a first switching element coupled to the second electrode of said first capacitor, supplying said third potential to said first capacitor, but preventing said first capacitor from discharging to said third potential;

a second switching element coupled to the second electrode of said first capacitor, the second electrode of said second capacitor, and said output terminal, allowing said second capacitor to discharge to said output terminal when the second electrode of said second capacitor is at a potential intermediate between said first potential and a potential of the second electrode of said first capacitor, and preventing said second capacitor from being charged from said output terminal when the second electrode of said first capacitor and the second electrode of said second capacitor are at equal potentials; and a third switching element coupled to the second electrode of said second capacitor, supplying said third potential to said second capacitor, but preventing said second capacitor from discharging to said third potential.

17. The voltage-boosting circuit of claim 16, wherein said first capacitor and said second capacitor are metal-oxide-semiconductor capacitors.

18. The voltage-boosting circuit of claim 16, wherein said first switching element, said second switching element, and said third switching element are field-effect transistors.

19. The voltage-boosting circuit of claim 18, wherein said first switching element has a source coupled to the second electrode of said first capacitor, and a gate and drain receiving said third potential.

20. The voltage-boosting circuit of claim 18, wherein said second switching element has a source coupled to said output terminal, a gate coupled to the second electrode of said first capacitor, and a drain coupled to the second electrode of said second capacitor.

21. The voltage-boosting circuit of claim 18, wherein said third switching element has a source coupled to the second electrode of said second capacitor, and a gate and drain receiving said third potential.

22. A voltage-boosting circuit receiving a first potential, a second potential, a third potential, a clock signal, and a mode signal, the second potential being intermediate between the first potential and the third potential, the clock signal alternating between a first level and a second level, and the mode signal having a first state and a second state, comprising:

an output terminal;

a timing generator receiving said clock signal and said mode signal, generating a first timing signal having an active state and an inactive state, and generating a second timing signal having an active state and an inactive state, said first timing signal being held in said inactive state when said mode signal is in said second state, said first timing signal going to the active state a certain time after said clock signal goes to said first level, provided said mode signal is in said first state, said first timing signal going to the inactive state when said clock signal goes to said second level, said second timing signal going to the active state when said clock signal goes to said first level, and said second timing signal going to the inactive state a certain time after said clock signal goes to said second level;

a first driving circuit coupled to said timing generator, outputting a first driving signal at said first potential when said first timing signal is in the inactive state, and outputting said first driving signal at said third potential when said first timing signal is in the active state;

a second driving circuit coupled to said timing generator, outputting a second driving signal at said first potential when said second timing signal is in the inactive state, and outputting said second driving signal at said second potential when said second timing signal is in the active state;

a first capacitor coupled to said first driving circuit, having a first electrode and a second electrode, the first electrode of said first capacitor receiving said first driving signal;

a second capacitor coupled to said second driving circuit, having a first electrode and a second electrode, the first electrode of said second capacitor receiving said second driving signal;

a first switching element coupled to the second electrode of said first capacitor, supplying said third potential to said first capacitor, but preventing said first capacitor from discharging to said third potential;

a second switching element coupled to the second electrode of said first capacitor, the second electrode of said second capacitor, and said output terminal, allowing said second capacitor to discharge to said output terminal when the second electrode of said second capacitor is at a potential intermediate between said first potential and a potential of the second electrode of said first capacitor, and preventing said second capacitor from being charged from said output terminal when the second electrode of said first capacitor and the second electrode of said second capacitor are at equal potentials;

a third switching element coupled to the second electrode of said second capacitor, supplying said third potential to said second capacitor, but preventing said second capacitor from discharging to said third potential; and a fourth switching element coupled to the second electrode of said second capacitor and said output terminal, allowing said second capacitor to discharge to said output terminal with a certain voltage drop, but preventing said second capacitor from being charged from said output terminal.

23. The voltage-boosting circuit of claim 22, wherein said first capacitor and said second capacitor are metal-oxide-semiconductor capacitors.

24. The voltage-boosting circuit of claim 22, wherein said first switching element, said second switching element, said third switching element, and said fourth switching element are field-effect transistors.

25. The voltage-boosting circuit of claim 24, wherein said first switching element has a source coupled to the second electrode of said first capacitor, and a gate and drain receiving said third potential.

26. The voltage-boosting circuit of claim 24, wherein said second switching element has a source coupled to said output terminal, a gate coupled to the second electrode of said first capacitor, and a drain coupled to the second electrode of said second capacitor.

27. The voltage-boosting circuit of claim 24, wherein said third switching element has a source coupled to the second electrode of said second capacitor, and a gate and drain receiving said third potential.

28. The voltage-boosting circuit of claim 24, wherein said fourth switching element has a source coupled to said output terminal, and a gate and drain coupled to the second electrode of said second capacitor.

* * * * *